(12) United States Patent
Fiori et al.

(10) Patent No.: US 7,652,099 B2
(45) Date of Patent: Jan. 26, 2010

(54) PROCESS FOR PRODUCING COATING COMPOSITIONS WITH CUSTOMIZABLE PROPERTIES

(75) Inventors: Denise Elizabeth Fiori, Trumbull, CT (US); Carl L. Kishbaugh, Townsend, DE (US); Laura Ann Lewin, Greenville, DE (US); Brian Edward Priore, Mount Royal, NJ (US); Audrey Pamela Stephenson, Philadelphia, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 690 days.

(21) Appl. No.: 11/518,712

(22) Filed: Sep. 11, 2006

(65) Prior Publication Data

US 2007/0212479 A1   Sep. 13, 2007

Related U.S. Application Data (60) Provisional application No. 60/716,743, filed on Sep. 12, 2005.

(51) Int. Cl.
*C08J 3/02* (2006.01)
(52) U.S. Cl. ..................................................... 524/501
(58) Field of Classification Search .................. 524/501
See application file for complete search history.

(56) References Cited

U.S. PATENT DOCUMENTS

| | | | |
|---|---|---|---|
| 4,413,084 A * | 11/1983 | Horvath | ....................... 524/315 |
| 6,277,497 B1 | 8/2001 | Aerts et al. | |
| 6,316,564 B1 | 11/2001 | Huybrechts et al. | |
| 6,559,327 B2 | 5/2003 | Gridnev et al. | |
| 6,642,311 B2 | 11/2003 | Barsotti et al. | |
| 6,902,820 B2 | 6/2005 | Huybrechts et al. | |
| 2002/0122887 A1 | 9/2002 | Forbes et al. | |

FOREIGN PATENT DOCUMENTS

| | | | |
|---|---|---|---|
| JP | 2001353470 | * | 6/2000 |
| WO | WO 02/14444 A1 | | 2/2002 |
| WO | WO 02/43880 A2 | | 6/2002 |

OTHER PUBLICATIONS

U.S. Appl. No. 11/518,783, filed Sep. 11, 2006, Fiori et al.
PCT International Search Report for International Application No. PCT/US2006/035414 dated Jan. 10, 2007.

* cited by examiner

*Primary Examiner*—Bernard Lipman
(74) *Attorney, Agent, or Firm*—Brian J. Myers (57) ABSTRACT

A process for making coating compositions with adjustable properties by blending two or more coating compositions of distinctly different attributes to achieve custom properties. The coating compositions formed herein are particularly useful in automotive refinish applications where customized properties are desired depending on the needs of the job.

9 Claims, 2 Drawing Sheets

FIG. 1

PROCESS FOR PRODUCING COATING COMPOSITIONS WITH CUSTOMIZABLE PROPERTIES

CROSS-REFERENCE TO RELATED APPLICATION

This application claims priority under 35 U.S.C. §119 from U.S. Provisional Application Ser. No. 60/716,743, filed Sep. 12, 2005.

FIELD OF THE INVENTION

The present invention relates to coating compositions that are particularly useful in automotive refinishing, and more particularly to a process for making such coating compositions with customizable properties by blending two or more coating compositions having distinctly different properties to achieve custom properties.

BACKGROUND OF THE INVENTION

To refinish or repair a finish on vehicle, such as a basecoat/clearcoat finish on automobile or truck bodies, different types of pigmented and clear coating compositions have been developed. Typically, the refinish coating system comprises a multiplicity of coatings applied to the vehicle. A primer-surfacer (or filler) is typically applied to the damaged area of the vehicle over a previously cured, but defective original basecoat/clearcoat finish, or over bare metal that has been stripped of damaged paint and primed with a rust-preventative refinish primer, to smooth the surface and provide a thick enough coating to permit sanding to a smooth, flat finish for topcoating. Sometimes, a sealer is next applied over the primer-surfacer to provide a surface to which a topcoat will better adhere. Then a top-coat system is applied, sometimes as a single colored coat, more often now as a basecoat with solid color and/or flake pigments followed by a transparent protective clear coat, to provide an attractive aesthetic appearance (such as gloss and distinctness of image) and preserve the color of the finish on the vehicle even on prolonged exposure to the environment or weathering.

For each coating layer, a number of different types of coating compositions are developed that offer different properties depending on the needs of the job. In the car refinishing industry, one problem faced with respect to the application of each layer of coating is the varying needs for each application. For example, when applying a coating material, such as an overall clearcoat, to an entire vehicle, greater spray latitude as well as a higher quality finish are required, which normally require a longer dry time. Meanwhile, if only a discreet part is to be coated such as a side panel or bumper, such a high quality finish is not always of paramount importance, and a shorter dry time to minimize the time required for the job is optimal. Variable dry times are obtained in practice by formulating numerous coating compositions having different properties and allowing the body shop painter to pick which composition he requires.

Due to this frequent need for different properties, a car repair facility today must stock multiple coatings for each layer in its inventory, which is very costly. Each coating typically comprises at least two separate components, i.e., a film forming binder component and a hardener for the binder (also known as an activator), which are stored in separate cans, that further exacerbates the high inventory problem. Some of these coatings also require a further component, such as a reducer for spray viscosity adjustments, or a flex agent, also stored in separate cans.

Attempts have been made to provide refinish coatings with adjustable properties to eliminate the need for inventory build up and allow the painter to dial in the properties needed for the job, as for example, as taught in Forbes et al. U.S. Patent Application Publication No. US 2002/0122887 A1, published Sep. 5, 2002. However, the Forbes et al. system requires use of a plural component (i.e., 3 component or more) spray apparatus which is not traditionally used in the automotive refinish industry. Varying mixing ratios of two like components from two different compositions, such as two hardeners with different reactivities, in the mix head of the spray gun also requires highly sophisticated equipment, which is expensive and cumbersome to use in a body shop operation.

In addition, the vast majority of body shops still prefer to use conventional spray equipment. These shops have also attempted to tailor properties, such as cure times or flash times, for specific job requirements by bench mixing various hardeners and/or reducers from different coating compositions, and then manual mixing the above with a standard binder to form an activated pot mix that can be sprayed through the conventional single feed equipment, which is known as cocktailing hardeners and reducers. However, as each component is normally designed for just one paint, using multiple combinations without adjusting binder to activator mixing ratios and catalyst levels gives rise to errors in stoichiometry and/or may compromise the film properties of the coating. This type of cocktailing also only allows for adjustment of one property at a time, without tailoring other essential characteristics needed to obtain a high quality finish. It also fails to allow the painter to tailor the paint via blending two distinct components to suit the environmental and total job requirements. Furthermore, cocktailing of film-forming binder portions has not heretofore been attempted for fear of total loss of film integrity and durability.

It would be advantageous to offer customized properties to the body shop painter without increasing the number of coating materials that a car refinish or autobody repair shop has to stock in its inventory. It would also be advantageous to offer coating materials that have customizable properties that are easy to formulate, meet the total job requirements, and can be applied to a substrate using conventional body shop spray equipment. This makes the customized paint available to any shop without need for specialized equipment. The present invention offers the unique combination of properties desired.

SUMMARY OF THE INVENTION

The invention is directed to a process for making automotive refinish coating compositions having customizable properties, so that numerous refinish coating compositions with different properties can be tailored from a limited few depending on the need of the job. Disclosed herein is a process for making a coating composition, said composition having adjustable properties, and for use in automotive refinish applications, said process comprising: (i) choosing at least two activatable refinish coating compositions, of same automotive coating layer or of different automotive coating layers, each coating composition having (a) at least one distinctly different property from the other coating composition, (b) different binder components and (c) a common activator component and a common mix ratio between the activator and unactivated film forming binder component; (ii) selecting a mix ratio for the unactivated binder portions of each of the coating compositions to achieve a new set of properties; and (iii) mixing, prior to introduction in the spray equipment, the common activator with the aforesaid combined binder portions in the aforesaid common binder to activator, to form a new coating composition with customized properties that can be sprayed onto a vehicle.

In a preferred embodiment, the new unactivated binder portion is premixed before introduction with the other components in the new coating composition.

The starting coating compositions are preferably activatable two or three component refinish coating compositions that contain a binder portion, an activator portion, and optionally a reducer portion for three component systems.

Each starting composition is formulated to have not only matching (i.e., corresponding) components, but also the same binder to activator volumetric mix ratio (i.e., the same or compatible stoichiometry), and a common activator, so that when the binder components from each of the two starting compositions are combined to give the coating with the desired properties, the refinisher can easily achieve the proper stoichiometry and desired properties without compromising the final film properties of the finish on the vehicle. As will be understood by those skilled in the art, the selection of the common activator for this blendable system is temperature dependent, i.e., the temperature of the body shop at the time of the refinish job will influence this selection.

Customizable properties can now be achieved without having to increase the amount of coating materials needed for the job and without having to use plural component spray equipment.

The invention is especially useful in automotive refinishing applications, more particularly in body shops, when repairing vehicles such as automobiles and trucks, since a plurality of coating compositions with varying properties can be made from a limited number of ready-made coating compositions by cocktailing binder components prior to spraying. The invention works best when cocktailing among and between refinish clearcoat, primer surfacer, and primer sealer compositions.

Also included within the scope of this invention are coating compositions having customizable properties and substrates such as vehicle bodies or parts thereof coated with the coating compositions disclosed herein.

DETAILED DESCRIPTION OF THE INVENTION

As used herein:

"Activator" is used herein interchangeably with the term "hardener".

"Common activator" means that the activator components are shared between the referenced coating compositions.

"Like binder components" means that there is a binder component in each of the coating compositions having the same type of chemical functionality but with a distinctly different property towards the common activator than that of the other binder component.

"Pot mix" means a ready to spray activated composition which comprises a mixture of the film-forming binder package, the activator package, and optionally reducer.

It has now been discovered that by utilizing a process in which you can simply vary the mixing ratios of two like binder components from two different off the shelf coating compositions that have a common activator, multiple coatings compositions with different properties can be made and the many needs of the automotive refinish industry can be met, without having to develop additional stand alone products that offer these properties. Multiple combinations of the two like binder components, mixed in a constant ratio with the common activator will give varying performance properties depending on the requirements of the job. Such performance will be in the range between the single combination of each of the like binder components with the common activator.

The present invention is particularly focused on adjusting the properties of refinish topcoats, such as clearcoats, and refinish undercoats, such as primer surfacers and sealers. Since these coating compositions are provided herein with common activator components and a common volumetric mix ratio between the binder and activator components, mixing and matching of the different binder components from different coating compositions of the same layer or of different layers can be easily done and will give the body shop painter enormous versatility with having to increase inventory or compromise the stoichiometry and final film properties of the finish.

Figure 1:
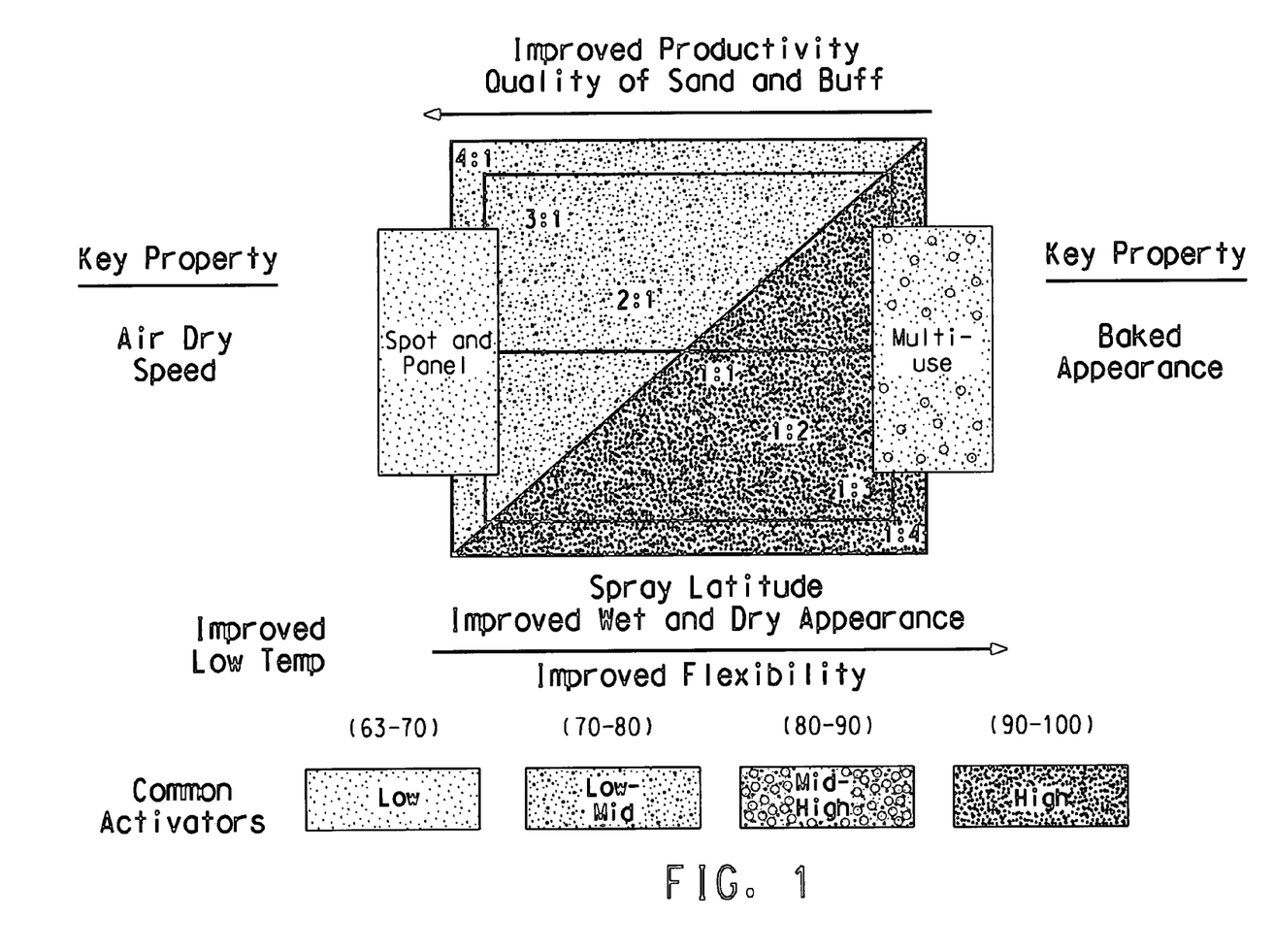
FIG. 1 shows an example where varying the mix ratios of two different clearcoat binders can alter the final properties (i.e., productivity, appearance, spray latitude, buff or polish quality) of these compositions depending on the body shop job requirements.

For example, in the car refinishing industry, versatility can now be achieved in clearcoats, as shown in FIG. 1, by varying the ratios of a fast reacting binder component taken from a spot and panel repair clearcoat with a slower reacting binder component taken from an overall clearcoat and mixing the components together in a constant ratio with the common activator, i.e., in the same binder to activator volumetric mix ratio, prior to introduction in a spray gun, to form coating compositions of varying attributes that can be sprayed in conventional spray equipment typically found in body shops. By "conventional spray equipment" is meant spray equipment that it is fed from one pot which contains a single pot mix. In such equipment, all mixing of reactive components is performed outside the gun. In a preferred embodiment, this means that the painter simply premixes the like binder components (tailored for the specific job requirements) and then mixes (i.e., activates) the above with the shared activator at the recommended constant mix ratio.

Other possibilities include mixing binder portions of undercoats such as two undercoats (two primer fillers) set up at different pigment to binder ("p/b") positions, wherein one has maximum fill (i.e., high p/b) and sandabilty and the other is focused on more durability position (i.e., lower p/b), better crosslink density, and better featheredge holdout, and the binder portions are combined at varying ratios to appeal to the customer's taste in terms of better sanding and productivity versus featheredge hold out.

Another example includes mixing binder portions of a flexible sealer having maximum flexibility/chip resistance (i.e., low Tg binder), and an adhesion sealer (i.e., higher Tg binder) having good productivity and good nib sanding and better hiding properties, to allow desired flexibility and desired productivity without adding a third component (a flex agent).

Figure 2:
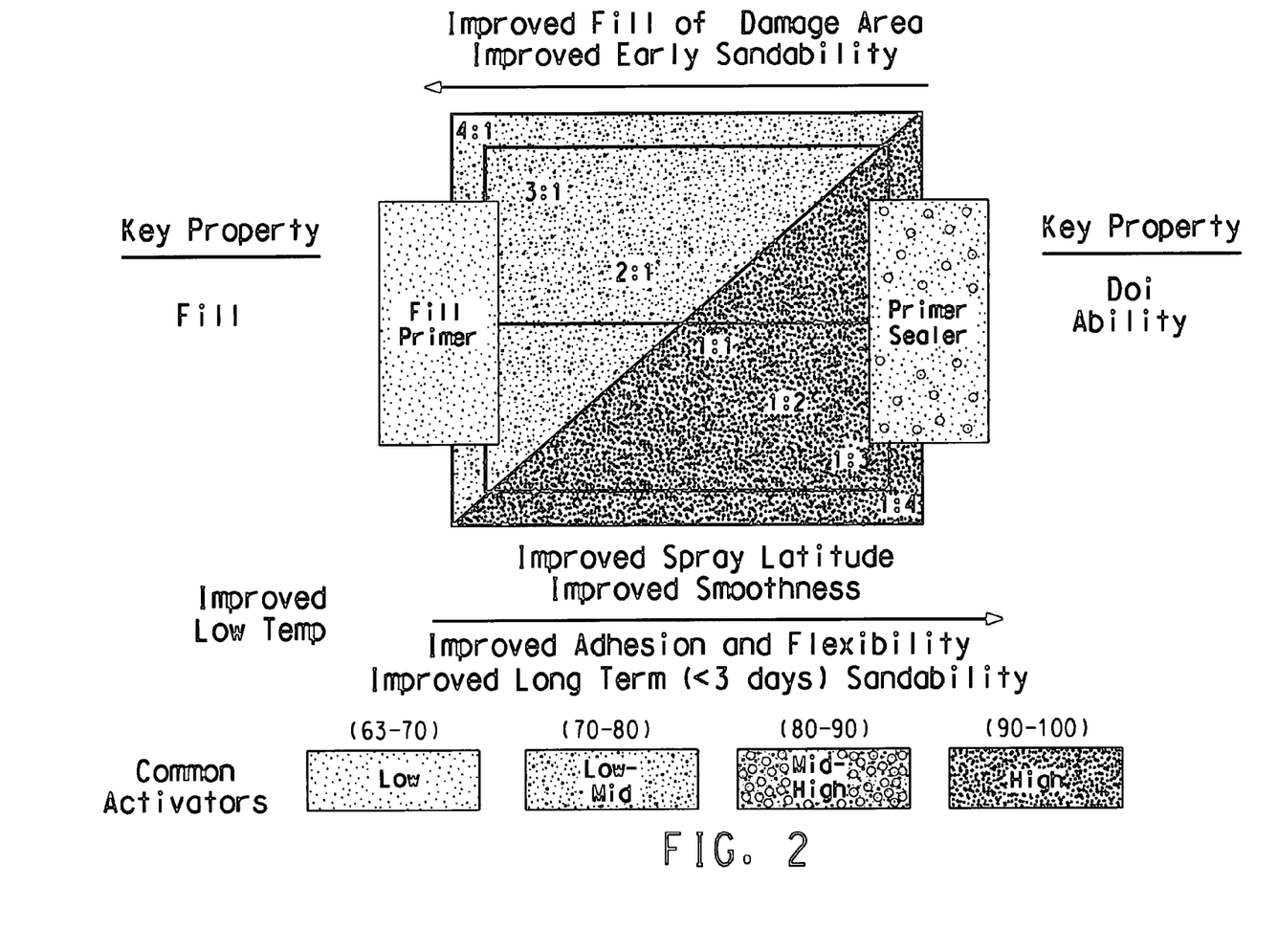
FIG. 2 shows an example where varying the mix ratios of two different binders from a primer filler and a primer sealer can alter the final properties (i.e., productivity, sandability, appearance, smoothness, spray latitude, flexibility) of these compositions depending on the body shop job requirements.

A further example is combining binder portions of a filler primer having productivity and sandability and a primer sealer having adhesion and DOI appearance, as shown in FIG. 2, to allow one to achieve a sandable sealer (to recover from a problem) with minimum fill and maximum DOI potential.

This is an advantage, since current sealers do not sand well which limits how fast the body shop painter can fix a problem that occurs during painting.

Another example is blending the binder portions of a filler primer with a clearcoat to blend into a sealer position focused on adhesion, non-sandabilty, and DOI (distinctness of image) appearance. This is an advantage since current sealers do not require sanding and additional cleaning step before topcoating, just a flash before topcoating, but DOI appearance is not as good as one may like.

In the process of the present invention, there are at least two like components contained in each of the starting coating compositions (such as binder components) having the same type of chemical functionality but with a distinctly different property (such as reactivity, Tg, etc.) towards the other components in the composition. Each of the like components can then be combined and substituted for the original like component in one of the two coating compositions to produce the attribute needed of the job.

Mixing and matching of like components, such as the binder portions, from two different coating compositions of the same layer (such as mixing and matching binder portions from a highly productive spot and panel clearcoat and a high quality overall clearcoat) while conceptually simple, has been difficult in practice, since each binder requires a different activator and activator stoichiometry. Therefore, simply combining the two like ingredients into one of the coating compositions results in incorrect stoichiometry and compromised film properties.

In the present invention, the starting coating compositions are formulated with matching (i.e., corresponding) components and the same constant binder to activator volumetric mix ratio (i.e., within the same stoichiometry range), so that mixing and matching for customized properties is now possible without introducing errors in stoichiometry and comprising the performance of the finish. Even more preferably it is generally desired that all components in the composition be shared (e.g., common activators, common reducers) except for the differently attributed binder components. Co-owned and co-pending U.S. patent application Ser. No. _______ (FA-1337) filed on the same day herewith, describes how to formulate refinish coating systems with common activators and common volumetric binder to activator mix ratios, to allow for such mixing and matching, and is hereby incorporated by reference in its entirety.

The constant binder to activator volumetric mix ratios are typically chosen so that that the body shop painter can easily make the desired combination in easy to formulate quantities. Preferably, in countries that use non-metric (i.e., English) units, the paints are formulated to have a binder to activator mix ratio of from about 8:1 to about 1:1, preferably from about 4:1 to about 1:1. A common binder to activator to reducer mix ratio for 3 component systems is 4:1:1. In countries that use metric units, the paint system can be formulated to a binder to activator ratio of from about 5:1 to about 1:1.

Two or three-component activatable coating compositions containing at least one binder component and at least one activator component and optionally at least one reducer component, are preferably used as the starting materials for this invention.

The invention can be used to formulate coatings with varying properties for the following coating layers: undercoats such as primer fillers and sealers and topcoats such as clearcoats.

For each coating layer, the coating properties that can be adjusted include:

Emission Properties:
VOC—volatile organic compound—limit is determined by environmental regulations worldwide Spray Properties:
Handling—how coatings spray (e.g., atomize, roll out or flow) at a fixed temperature.
Spray Latitude—over how broad a temperature range, optimal handling is maintained.
Wet Appearance—smooth and uniform is more important the larger the job and this is especially critical for clearcoats.

Productivity of the Coating:
Productivity—total processing time this will vary depending on the coating.
Dry Time—between coats—also called flash time is the time required before another like coat or adjacent coat can be applied on top of the just sprayed coating.
Dust Free Time—in an air dry situation is the time required before coating can be removed from a booth without dust adhering to the coating.
Time to sand—is time required after application when coating has achieved enough film integrity to handle abrading with varying grits of sand paper, e.g., clearcoats are generally abraded with 1500-2000 grit sand paper to remove imperfections. Primers are generally abraded with 400 grit sandpaper.
Buffing Time—time required before polishing. This is generally for clearcoats.
Assembly time—is the time required to handle the painted part without print damage to the coating.

Physical Properties:
Dry Appearance—for clearcoats is the retained gloss, DOI, and uniformity from dry to touch time through job completion. For undercoats—it is the comparison of gloss, DOI and uniformity of the clearcoat when one compares an area that has been undercoated vs. an area that has the original paint.
Feather edge holdout—is important for undercoats. It is how easily the repair area can be seen through basecoat and clearcoat. How well the undercoat hides the transitions between each of the sanded layers. In other words, it is the ability to fill the damage area and provide enough film strength and integrity to provide resistance to deformation of the subsequent coatings so that the repair area is not visible through after topcoating.
Flexibility—the resistance to fracture when bent. This is applicable to both clearcoats and undercoats.
Quality of Sanding—is how easy it is to abrade the coated layer for clearcoats and undercoats. The preference is for easy abrasion.
Quality of Buffing—applies to clearcoats and is the ease of restoring overall gloss and DOI (appearance) of a clearcoat using a buffing compound (e.g., 3M Perfect it 2).
Adhesion—means how well the coating sticks to what is above and below the coating. Different coating formulations have different degrees of adhesion to various substrates, e.g., DTM (direct to metal) and plastic adhesion. By blending coatings with differing adhesion one can achieve adhesion over the desired substrate.
Print value—means resistance and recovery of a coating after touching it with a fingerprint—which is a function of film hardness and cure.

Specifically regarding the coating compositions that can be used in the present process, they are preferably activated and optionally reduced coating compositions. Typically the compositions are activated (i.e., crosslinking) compositions that are not reduced. An activator (i.e., crosslinking, hardening) component is generally known to provide the improved level of durability and weatherability required for automotive and truck undercoats and topcoats. A reducer is chosen to reduce the viscosity of the coating, and is chosen to meet a desired flash time depending on environmental conditions. The reducer is normally made up of fast and/or slow solvents, and optionally catalysts. If a reactive reducer is used, it may also include co-reactants such as binder resins, crosslinking agents, reactive diluents, and the like.

Since the coating composition of the present invention contains a crosslinking agent, such as a polyisocyanate, the coating composition is usually supplied in the form of a two-pack coating composition in which the first-pack includes the binder component and the second pack includes the crosslinking (i.e., activator) component, e.g., a polyisocyanate.

Generally, the first and the second packs are stored in separate containers and mixed before use. The containers are preferably sealed air tight to prevent degradation during storage. The coating composition containing a crosslinking component preferably includes one or more catalysts to enhance crosslinking of the components on curing, which may be stored in any one of the containers. Suitable catalysts for polyisocyanate can include one or more tin compounds, tertiary amines or a combination thereof, and the like. The mixing of the two components may be done, for example, in a separate container to form a sprayable pot mix (i.e., activated coating). A layer of the pot mix is typically applied to a substrate by the above conventional spray techniques. Of course, three-packs are used when a reducer is present.

The coating compositions for use in the present invention may include, but are not limited to, compositions comprising the following combination of functional groups: hydroxy/isocyanate, isocyanate/amine, amine/epoxy/isocyanate, amine/epoxy, epoxy/anhydride, hydroxy/silane/amine, hydroxy/anhydride, amine/anhydride, acetoacetate/amine. Any of the forgoing amines can also be replaced with blocked amines like aldimines, ketimines or oxazolidines, and the like, as will be apparent to those skilled in the art. The catalyzed reaction of any of the forgoing combinations of functional groups will result in crosslinking polymerization reactions that cause curing of the coating material.

The present invention is further explained on the basis of the hydroxy isocyanate reaction. However, the invention is not restricted thereto.

The properties of hydroxy functional binders can be changed or modified in a variety of ways well known to those skilled in the art. For instance, with respect to hydroxy functional binders, their reactivity can be modified by changing from the use of a secondary hydroxyl group to a primary hydroxyl group, or by increasing the amount of the hydroxyl groups present, thereby increasing the functionality of the binder, or by increasing the molecular weight or the rigidity of the binder (Tg). The hydroxy functional binder may be selected from a polyester polyol, polyurethane polyol, or polyacrylate polyol.

Since a common activator is used herein, the polyisocyanate activator will be chosen so that it has sufficient reactivity with each of the differently attributed binder components in each of the starting coating compositions. Any of the conventional fast or slower reacting polyisocyanate activators can be used. For instance, a slow reactive isocyanate group based polyisocyanate like α,α,α',α"-tetramethyl o-, m-, and p-xylyene diisocyanate (TMXDI) or isophorone diisocyanate (IPDI) can be used as well as a somewhat faster reacting polyisocyanate like hexane diisocyanate (HDI) based polyisocyanate or even more highly reactive polyisocyanates like toluene diisocyanate (TDI) and diphenylmethane 4,4'-diisocyanate (MDI) based polyisocyanates. The higher the molecular weight and or functionality of the polyisocyanate the more reactive the system it is used in will be.

Also with respect to the activator, typically, a paint manufacturer will formulate a group of activators that the application specialist will chose depending upon conditions, usually temperature. The paint manufacturer will change various ingredients of the formulation to match spray conditions. The ingredients that can be varied include but are not limited to the type and concentrations of polyisocyanate, catalyst, solvent, and the like. Furthermore, since a common binder to activator mix ratio is provided across all coating compositions used herein, the typical stoichiometric range of isocyanate to hydroxyl chosen herein for each of the coating compositions will be from 0.7 to 2, preferably 0.8 to 1.8, and most preferably of 0.9 to 1.6.

A variance in the amount of catalyst in the binder or activator components can also change the reactivity of the respective components. Catalysts in polyurethane resin systems applicable in the present invention include but are not limited to dibutyl tin dilaurate, dimethyl tin dichloride, dioctyl tin dilaurate, and 1,4-diazobicyclo(2.2.2) octane. Reactivity can be easily adjusted to the required level.

As indicated above, a reducer which mainly includes conventional fast and/or slow drying solvents is optional.

The sprayable coatings formed by the process of this invention may be applied to any substrate.

The process of the present invention may be applied to any substrate, especially to a vehicle body or part thereof, by conventional techniques such as spraying and electrostatic spraying. When reactive components (i.e., crosslinking components) are used, the reactive components are stored separately typically in sealed airtight containers to prevent degradation and mixed in a container to form an activated pot mix just prior to use or 5 to 30 minutes before use.

The substrate may be, for example, metals, e.g., iron, steel, and aluminum, plastics, fiberglass reinforced moldings, synthetic materials, or another coating layer. The other coating layer may be applied by carrying out the process of the current invention or it may be applied differently.

The substrates can have any shape, but are preferably in the form of bodies and parts (e.g. hoods, doors, fenders, bumpers and/or trim) of automobiles such as passenger cars, trucks, motorcycles, buses, recreational vehicles, and the like.

Physical drying (dry to touch) and curing of the coating compositions applied by the process of the present invention may be conducted under a variety of conditions known to a person skilled in the art, although drying and curing is preferably carried out under ambient temperature or low bake conditions, typically from ambient to about 70° C. (60 to 160° F.).

The present invention can be carried out to formulate and apply a clearcoat composition over a basecoat. It can also be done with a primer-surfacer and sealer.

The following examples further illustrate the present invention, however, these are not to be construed as limiting the present invention to their details. All parts and percentages are on a weight basis unless otherwise indicated. All molecular weights disclosed herein are determined by GPC (gel permeation chromatography) using polystyrene as the standard. Unless otherwise specified, all chemicals and reagents can be obtained from Aldrich Chemical Company, Milwaukee, Wis.

EXAMPLES

The following customized coatings were prepared from off the shelf products mentioned commercially available from E.I. du Pont de Nemours and Company.

Example 1

Blending of an Overall Clearcoat with a Spot and Panel Clearcoat

The following two different binder and one activator components were provided and used to formulate various coating compositions as shown below:

Preparation of an Overall Clearcoat Binder Portion (Part 1)

| Ingredients | Parts by Weight |
|---|---|
| Acrylic polymer #3 | 6611.47 |
| Polyester oligomer #2 | 271.06 |
| Acrylic Copolymer #4 | 1841 |
| Tinuvin 384[1] | 69.1 |
| Tinuvin 292[1] | 65.78 |
| Methyl amyl ketone | 2412.41 |
| Acetone | 16.22 |
| Dibutyl Tin dilaurate | 46.8 |
| Ethyl-3-ethoxypropionate | 579.15 |
| BYK 306[2] | 41.46 |
| BYK 358[2] | 49.01 |
| Xylene | 222.23 |

[1]Available from Ciba Specialty Chemicals, Tarrytown, NY
[2]Available from BYK Chemie, Wallingford, CT.

To a can, all of the components in Part 1 are added in the order given with mixing. After the last addition, mixing was continued for 30 minutes. Components in Part 2 were then accurately weighed and added in the order give with mixing. The blend continued to mix for one hour before filling out into individual gallon cans. The following properties were met:

| | |
|---|---|
| Gallon weight | 7.56-7.76 pounds/gallon |
| Weight Solids | 38.5-40.5% |
| Color | <50 APHA |

Preparation of a Spot and Panel Clearcoat Binder Portion (Part 1)

| Ingredients | Parts by Weight |
|---|---|
| Part 1 | |
| Acrylic Polymer #2 | 544.6 |
| Methyl Amyl Ketone | 51.1 |
| Methyl Isobutyl Ketone | 75.5 |
| Toluene | 16.1 |
| Acetone | 267.7 |
| Polyester Oligomer #1 | 16.6 |

-continued

| Ingredients | Parts by Weight |
|---|---|
| Part 2 | |
| Tinuvin ® 384-2[1] | 4.9 |
| Tinuvin ® 292[1] | 4.7 |
| BYK ® 358[2] | 3.6 |
| BYK ® 306[2] | 3.1 |
| Triethylenediamine (10% in xylene) | 2.8 |
| Dibutyl Tin Dilaurate (2% in ethyl acetate) | 8.2 |
| Acetic Acid | 1.2 |

[1]Available from Ciba Specialty Chemicals, Tarrytown, NY
[2]Available from BYK Chemie, Wallingford, CT.

To a can, all of the components in Part 1 are added in the order given with mixing. After the last addition, mixing was continued for 30 minutes. Components in Part 2 were then accurately weighed and added in the order give with mixing. The blend continued to mix for one hour before filling out into individual gallon cans. The following properties were met:

| | |
|---|---|
| Gallon Weight | 7.44-7.64 pounds/gallon |
| Weight Solids | 34-36% |
| Color | <50 APHA |

Preparation of Common Activator Portion (Part 2) for each of the Above Binder Portions (Targeted for 70-75° F. Application Window)

| Ingredients | Parts by Weight |
|---|---|
| Desmodur ® N 3300A[1] | 430.0 |
| Desmodur ® Z 4470 BA[1] | 53.9 |
| Butyl Acetate | 285.3 |
| Ethyl 3-Ethoxy Propionate | 98.3 |
| Xylene | 130.3 |
| Dibutyl Tin Dilaurate | 0.13 |
| P-toluene Sulfonyl Isocyanate | 2.0 |

[1]Desmodur ® N 3300A and Desmodur ® Z 4470 BA are commercial HDI and IPDI polyisocyanate products, available from Bayer Material Science Corporation, Pittsburgh, PA.

All of the ingredients above were added in the order given to a metal can and mixed for 60 minutes using an impeller. During the mixing process, the mouth of the can was covered, and the contents were blanketed with nitrogen. The solution was transferred to air-tight quart containers and sealed under a nitrogen atmosphere. The following properties were met:

| | |
|---|---|
| Gallon Weight | 8.26-8.46 pounds/gallon |
| % Water | <0.05% wt |
| Weight Solids | 45.5-48.5% |
| % Isocyanate | 9.6-10.2% wt |
| Color | <50 APHA |

The following resins were used in the clearcoat binder portions prepared above:

Preparation of Acrylic Polymer #3

| Ingredients | Parts by Weight |
|---|---|
| Part 1 | |
| Xylene | 46.67 |
| Part 2 | |
| Styrene | 15.00 |
| Methyl methacrylate | 20.00 |
| 2-Ethyl-hexylacrylate | 45.00 |
| 2-Hydroxyethlyacrylate | 20.00 |
| Part 3 | |
| Luperox 7M75[1] | 2.40 |
| xylene | 10.00 |
| Part 4 | |
| Luperox 7M75[1] | 0.60 |
| Methylethyl ketone | 10.00 |

[1] Available from Arkema Inc., Philadelphia, PA

Part 1 was charged to a reactor equipped with a stirrer, condenser, and a nitrogen inlet. The solvent was heated to reflux, approximately 140° C. Part 2 was mixed and added to the reaction over a 3-hour period. Part 3 was premixed and added to the reaction over a 3-hour period concurrently with a premixed part 2. When the additions of parts 2 and 3 were complete, part 4 was mixed and was added to the reactor over a 60-minute period. When the addition was complete, the reaction was held at reflux for an additional 60-minutes then cooled and filled out. The batch was tested to be 59.8% solids and have a Gardner-Holdt viscosity of V.

In the clearcoat binder prepared above, polyester oligomer#2 was prepared as follows:

Preparation of Polyester Oligomer #2

| Ingredients | Parts by Weight |
|---|---|
| Part 1 | |
| Butyl acetate | 62.92 |
| Pentaerythritol | 67.73 |
| Milldride MHHPA[1] | 244.46 |
| Part 2 | |
| Glydexx Glycidylester N-10[2] | 383.81 |
| Dibutyl tin dilaurate | 0.70 |
| Butyl acetate | 27.00 |
| Part 3 | |
| Butyl acetate | 84.08 |

[1] Available from Milliken Chemical Company, Spartanburg, SC
[2] Available from Resolution Performance Products, Hoogvliet, Netherlands Part 1 was charged to a reactor equipped with a stirrer, condenser, and a nitrogen blanket and was heated to 145° C. The reaction was held at 145° C. for 1 hour. Part 2 was fed to the reactor over a one-hour period while maintaining the reaction at 145° C. After part 2 was added, the reaction was heated to reflux, approximately 170° C., and was held at that temperature until the acid number was less than 1.0. When the acid number was less than 1.0, part 3 was added to the reactor and the mixture was heated at reflux for an additional 30 minutes. The reaction was cooled and filled out. The reaction mixture was 80.1% solids and had a Gardner-Holdt viscosity of W.

Preparation of Acrylic Copolymer #4

| Ingredients | Parts by Weight |
|---|---|
| Part 1 | |
| Methyl amyl ketone | 6.8 |
| Part 2 | |
| Hydroxyethyl methacrylate | 22.2 |
| Isobornyl acrylate | 37.8 |
| Methyl amyl ketone | 1.6 |
| Part 3 | |
| Methyl amyl ketone | 20.4 |
| t-butyl peroxy acetate | 1.8 |
| Part 4 | |
| Methyl amyl ketone | 7.6 |
| t-butyl peroxy acetate | 1.8 |

In a two reactor set, the first being operated at $1/10^{th}$ the volume of the second, and connected to the second via a transfer line, Part 1 was added and heated to 190° C. at 2.5 bar pressure. Part 2 followed by Part 3 were then charged to separate feed tanks, mixed and then fed to the first reactor over 280 minutes. Once the feeds increase the level in the first reactor to 90% of its normal operating volume, the reaction product from the first reactor was transferred to the second reactor so as to maintain a constant level in the first reactor. After 40 minutes of transfer from the first reactor to the second reactor, the second reactor was heated to reflux and Part 4 was fed to the second reactor over 270 minutes. Once Part 2 and 3 feeds were completed, the entire contents of the first reactor were dumped into the second reactor. The second reactor was held at reflux for 1 hour at 157° C., cooled and emptied. The resulting copolymer had GPC Mn of 1704, GPC Mw of 3380 and Mw/Mn of 1.98 with near complete conversion of the monomer. The average number of functionalities (hydroxyl) is 4.8 per polymer chain. The Tg of the copolymer was 57.3° C.

Preparation of Acrylic Polymer #2

| Ingredients | Parts by Weight |
|---|---|
| Part 1 | |
| Xylene | 229.12 |
| Part 2 | |
| Styrene | 73.64 |
| Methyl methacrylate | 93.19 |
| Isobutyl methacrylate | 220.93 |
| 2-Hydroxyethyl methacrylate | 98.19 |
| Part 3 | |
| t-butyl peroxyacetate | 11.78 |
| Xylene | 49.1 |
| Part 4 | |
| Xylene | 2.95 |
| Methyl ethyl ketone | 49.1 |

Part 1 was charged to a reactor and heated to reflux (138-142° C.). The ingredients of part 2 were mixed and added to the reactor simultaneously with the premixed ingredients of part 3 over a three-hour period. When the addition of parts 2 and 3 was complete, part 4 was added and the reaction was held at reflux for 1 hour. The reaction was cooled and filled out. The acrylic polymer had a weight solids content of 59.6% and a weight average molecular weight of 10500.

Preparation of Polyester Oligomer #1

| Ingredients | Parts by Weight |
|---|---|
| Part 1 | |
| Methyl Amyl Ketone | 168.02 |
| Pentaerythritol | 114.25 |
| Sanko HCA[1] | 3.58 |
| Tetraethyl ammonium bromide | 2.64 |
| Liquid Anhydride MHHPA 37[2] | 412.18 |
| Part 2 | |
| 1,2-Butylene oxide | 202.33 |

[1]Sanko HCA is available from Sanko Chemicals Co Ltd, Osaka, Japan
[2]Available from Lonza Chemical, Basal, Switzerland The ingredients of part 1 were charged to reactor with stirring and were heated to 60° C. The temperature was allowed to level off after the resulting exotherm. The reaction mixture was then heated to 140° C. and held for 2 hours. The ingredients of part 2 were charged to the reaction over a 4 hour period. The reaction temperature was maintained at 140° C. until the acid number falls below 3.0 (approx. 6 hours). The reaction mixture was cooled and filled out. The structured polyester oligomer had a weight solids content of 81.4% and a weight average molecular weight of 1069.

Example 2

Room Temperature Blending of a Spot and Panel Clearcoat with an Overall Clearcoat to Produce a Clearcoat for a Low Bake System with varying Dry Time and Appearance The following clearcoats were prepared:

Clearcoat 1-500 mL of the binder portion of an overall clear formulation (Part 1 of overall clear above) was combined with 125 mL of common activator (prepared above) (Part 2). The solution had an initial Zahn 2 viscosity of 14:96 seconds (4:1). The composition was sprayed by an application expert in two coats (at 75° F.) over DuPont Chromabase® basecoat (light blue metallic) and were baked for 30 minutes at 140° F. in an Accudraft (downdraft) booth. The dry time after one coat was 8 minutes. The coating sprayed well and had good appearance. The thickness of the coating was 2.7 mils and the wavescan measurement was LI 1.8 and S 13.1 after 2 hours. Thirty minutes after bake, the print value was 4. This clearcoat served as the "control" since it contained 100% overall clearcoat binder.

Clearcoat 2-400 mL of a binder portion of an overall clear formulation (Part 1) as above and 100 mL of a spot and panel clear (Part 1 of spot and panel clear prepared above) were combined (at a 4:1 volumetric mix ratio of overall to spot and panel) with stirring and then 125 mL of the common activator (Part 2 above) (at 4:1 binder to activator volumetric mix ratio) was added. The solution had an initial Zahn 2 viscosity of 14:62 seconds. The compositions were sprayed by an application expert in two coats (at 75 F) over Chromabase basecoat (light blue metallic) and were baked for 30 minutes at 140 F in booth. The dry time after one coat was 7 minutes. The coating sprayed well and had acceptable appearance (better than the example above). The thickness of the coating was 3.1 mils and the wavescan measurement was L 2.3 and S 17.9 after 2 hours. Thirty minutes after bake, the print value was 5.5. This clearcoat contained 80% overall clear binder and 20% spot and panel binder. This example shows slightly worse appearance and improved print, in comparison to the control.

Clearcoat 3-250 mL of a binder portion of an overall clear formulation (prepared above) (Part 1) and 250 mL of spot and panel clearcoat (prepared above) (Part 1) were combined with stirring and then 125 mL of common activator (prepared above) (Part 2) was added (1:1 binder overall to binder spot volumetric mix ratio) (4:1 binder to activator volumetric mix ratio). The solution had an initial Zahn 2 viscosity of 14:35 seconds. The compositions were sprayed by an application expert in two coats (at 75 F) over Chromabase basecoat (light blue metallic) (available from DuPont Company, Wilmington, Del.) and were baked for 30 minutes at 140 F in an Accudraft (downdraft) booth. The dry time after one coat was 4 minutes. The coating sprayed well and had acceptable appearance. The thickness of the coating was 3.4 mils and the wavescan measurement was L 3.2 and S 17.3 after 2 hours. Thirty minutes after bake, the print value was 6. This clearcoat was made up of 50% overall clear binder and 50% spot and panel clearcoat binder. This allows for better print value (hardness) but gives little worse appearance than the control.

By combining the binder of the overall clearcoat with the binder of the spot and panel clear, one can tailor print value and appearance, such as significantly improve print value and still maintain good appearance. The more spot and panel clear binder is added the faster the dry time between coats, the better the print value, but the appearance is worse. The painter can choose an acceptable appearance, handling, and dry time etc. for each job.

Test Methods Used in this Example:

An expert presses the coating for ~1 sec and then rates the depth of the print and the recovery time.

Rating
2 mushy print with no recovery
4 medium depth with slow recovery
5 medium depth with medium recovery
5.5 shallow print with a medium recovery
6 very shallow print with a fast recovery Wavescan Measurement Measure the appearance of a coating with a wavescan plus from Byk-Gardner. The wavescan evaluates the optical characteristics of a structures surface. Record the corrected values for the long (L) and the short (S) wavescan values. This measurement corrects for any dirt/defects on the coating surface. The lower the values of L and s the better the appearance of the coating.

Example 3

Moderate Temperature Blending of a Spot and Panel Clearcoat with an Overall Clearcoat to Produce an Air-Dry Clearcoat with varying Appearance and Handling The same components as above were used.
The following clearcoats were prepared:
Clear 1-300 mL of spot and panel clear binder (Part 1) as above and 300 mL of overall clear binder formulation (Part 1)

as above were combined with stirring and then 150 mL of common activator (Part 2) as above was added to activate the blend. The solution had an initial Zahn 2 viscosity of 13.8 seconds. Within fifteen minutes, the composition was sprayed in a downdraft spray booth by an application expert in two coats (at 74° F.) over Chromabase basecoat. The dry time after one coat was 7 minutes. After the second coat, the system was air dried at 74° F. The coating sprayed well (good atomization and roll out). Overspray drift was measured to be over 40 inches. Print hardness increased from 2 at 90 minutes to 5 at 4 hours, and the coating was ready sand-and-buff repair between 3 and 4 hours. The thickness of the clearcoat was 1.8 mils.

Clear 2-450 mL of spot and panel binder as above and 150 mL of overall clear binder formulation as above were combined with stirring and then 150 mL of common activator as above was added to activate the blend. The solution had an initial Zahn 2 viscosity of 13.6 seconds. Within fifteen minutes, the composition was sprayed in a downdraft spray booth by an application expert in two coats (at 74 F) over Chromabase basecoat. The dry time after one coat was 7 minutes. After the second coat, the system was air dried at 74° F. The coating sprayed well (fair atomization and fair-to-good roll out). Overspray drift was measured to be 36 inches. Print hardness increased from 4 at 100 minutes to 5 at 2.5 hours, and the coating was ready sand-and-buff repair between 2.5 and 3 hours. The thickness of the clearcoat was 2.3 mils.

Clear 3-600 mL of spot and panel clear binder as above was activated with 150 mL of common activator as the control. The solution had an initial Zahn 2 viscosity of 13.7 seconds. Within fifteen minutes, the composition was sprayed in a downdraft spray booth by an application expert in two coats (at 74 F) over Chromabase basecoat. The dry time after one coat was 6 minutes. After the second coat, the system was air dried at 74° F. The coating sprayed fair (fair-to-good atomization, fair-to-poor roll out, dry) and was given a handling rating of 6. Overspray drift was measured to be 18 inches. Print hardness increased from 5.5 at 100 minutes to a 6 at 2.5 hours, and the coating was ready sand-and-buff repair at 1.5 hours. The thickness of the clearcoat was 2.4 mils.

In general, there was a trade-off between improvements in application and appearance and a decrease in productivity as the level of the overall clear binder formulation increased. In terms of handling, the spray atomization quality, the roll out of the applied layer on the substrate, and the perceived fullness improved as the overall clear binder formulation content increased. All coatings achieved the minimum handling rating required for commercial products of 6. For wet and dry appearance evaluation, blends with increasing overall clear binder formulation showed progressively better gloss and distinctness-of-image through reduced surface texture and haziness. Hardness development slowed with increasing overall clear binder formulation content. As a result, the time necessary for the coating to achieve acceptable sand-and-buff repair increased significantly. Further, the distance from the repair that must be protected to prevent the overspray from adhering to the non-damaged section grew with overall clear binder formulation level.

Example 4

High Temperature Blending of Spot and Panel Clearcoat with an Overall Clearcoat to Produce an Air Dry Clearcoat with varying Spray Latitude The same components as above were used except that the common activator was changed.

The common activator component (Part 2) used in this example for each of the binder was an activator targeted for a >80° F. application window and was prepared as follows:

| Ingredients | Parts by Weight |
|---|---|
| Desmodur ® N 3300A | 430.0 |
| Desmodur ® Z 4470 BA | 53.9 |
| Butyl Acetate | 111.4 |
| N Pentyl Propionate | 286.3 |
| Ethyl 3-Ethoxy Propionate | 87.3 |
| 2-Ethylhexyl Acetate | 29.1 |
| P-toluene Sulfonyl Isocyanate | 2.0 |

All of the ingredients were added in the order given to a metal can and mixed for 60 minutes using an impeller. During the mixing process, the mouth of the can was covered, and the contents were blanketed with nitrogen. The solution was transferred to air-tight quart containers and sealed under a nitrogen atmosphere. The following properties were met:

| | |
|---|---|
| Gallon Weight | 8.22-8.42 pounds/gallon |
| % Water | <0.05% wt |
| Weight Solids | 45.5-48.5% |
| % Isocyanate | 9.6-10.2% wt |
| Color | <50 APHA |

The following clearcoats were prepared:

Clear 1-450 mL of spot and panel binder (Part 1) as above and 150 ml of overall clear binder formulation (Part 1) as above were combined with stirring and then 150 mL of the common activator (Part 2) (prepared for this example) was added to activate the blend. Prior to mixing, all components were placed in a 100° F. room for 1.5 hours and allowed to come to temperature. The activated solution had an initial Zahn 2 viscosity of 13.2 seconds. Within fifteen minutes, the composition was sprayed in a downdraft spray booth by an application expert in two coats (at 101° F.) over DuPont Chromabase® basecoat. Substrate temperature was allowed to come to equilibrium before application of the clearcoat. The dry time after one coat was 6.75 minutes. After the second coat, the system was air dried at 100° F. and 18% relative humidity. The coating sprayed well (good atomization, fair-to-good roll out). There was slight dry texture in the dried coating and wavescan measurements on the repair hood 4 hours after application were L=3.2 and S=10.6. Print hardness was 5 at 90 minutes. Although the coating was deemed ready sand-and-buff repair at this time, the sandpaper caused slight gouging in the clearcoat. The thickness of the clearcoat was 2.8 mils.

Clear 2-600 mL of spot and panel clear (Part 1) as above was activated with 150 mL of the common activator (Part 2) prepared for this example. Prior to mixing, components were placed in a 100° F. room for 1.5 hours and allowed to come to temperature. The activated solution had an initial Zahn 2 viscosity of 14.4 seconds. Within fifteen minutes, the composition was sprayed in a downdraft spray booth by an application expert in two coats (at 104° F.) over Chromabase basecoat. Substrate temperature was allowed to come to equilibrium before application of the clearcoat. The dry time after one coat was 4.25 minutes. After the second coat, the system was air dried at 100° F. and 18% relative humidity. The coating sprayed fair (fair atomization, fair-to-poor roll out, dry). There was fuzz and dry texture issues on the dry coating; wavescan measurements on the repair hood 4 hours after application were L=15 and S=44. Print hardness was 5.5 at 90 minutes, and the coating was ready sand-and-buff repair at this time. The thickness of the clearcoat was 3.1 mils. This example served as the control as it contained 100% of spot and panel clear binder.

In general, there was a trade-off between improvements in application and appearance and a decrease in productivity as overall clear formulation was blended into spot and panel clear binder. In terms of handling, the spray atomization quality, the roll out of the applied layer on the substrate, and the perceived fullness improved with the addition of overall clear binder formulation. At these extreme temperatures, the blended formulation showed spray latitude comparable to commercial spot and panel clear applied under much more forgiving conditions. For wet and dry appearance evaluation, blends with overall clear formulation showed better gloss and distinctness-of-image through reduced surface texture and haziness. Hardness development slowed with the addition of overall clear formulation resulting in a longer time before the coating is ready for sand-and-buff repair and/or increased diligence during the repair process.

Example 5

Blending of a Primer Filler with a Sealer

Preparation of a Primer Filler Binder Formulation (Part 1)

| Ingredients | Parts by Weight |
| --- | --- |
| Part 1 | |
| Dispersion Formula #1 | 820.7 |
| Part 2 | |
| Butyl Acetate | 11.7 |
| Methyl Isobutyl ketone | 16.9 |
| Ethyl acetate | 37.6 |
| Propylene glycol monomethyl ether acetate | 11.4 |
| Acrylic Polymer #1 | 17.1 |
| Toluene | 3.3 |
| Dibutyl tin diacetate[1] (10% in xylene) | 1.1 |
| Octo-Soligen Zinc 8[2] | 6.0 |
| Part 3 | |
| BYK-410[3] | 3.3 |

[1]Available from Air Products, Allentown, PA
[2]Available from Lanxess Corp., Akron OH
[3]Available from BYK Chemie, Wallingford, CT Dispersion Formula #1 was placed into a metal can. The dispersion was stirred with a propeller blade. The ingredients from Part 2 were added in order and the mixture was stirred for 30 minutes. Part 3 was added slowly and the mixture was stirred for 1 hour. The primer filler was allowed to sit for 2 hours before analysis.

Preparation of Sealer Binder Formulation (Part 1)

| Ingredients | Parts by Weight |
| --- | --- |
| Part 1 | |
| Butyl acetate | 155.11 |
| Xylene | 63.02 |

-continued

| Ingredients | Parts by Weight |
| --- | --- |
| Methyl amyl ketone | 92.33 |
| Polyester oligomer #1(from above) | 35.34 |
| Acrylic polymer #2 (from above) | 227.98 |
| GTP AB-Dispersant[1] | 6.62 |
| BYK-320[2] | 2.62 |
| Anti-Terra U[2] | 3.49 |
| Dibutyltin diacetate[3] | 1.32 |
| Anti-settling dispersion[4] | 39.82 |
| Part 2 | |
| Mistron Monomix[5] | 148.64 |
| ZEEOS G200 Ceramic Microspheres[6] | 201.83 |
| Part 3 | |
| Barium sulfate | 79.03 |
| Ti-Pure R-960[7] | 100.78 |
| Raven 410 powder[8] | 2.17 |
| Part 4 | |
| Xylene | 63.02 |

[1]Prepared according to Example #1 US6316564.
[2]BYK-320 resin and Anti-Terra U are both available from BYK Chemie, Wallingford, CT.
[3]10% solution in xylene
[4]Dispersion of Anti Terra-U 3.75%, xylene 88.75%, and Bentone 34 7.5%. Bentone 34 is available from Elementis, Hightstown, NJ
[5]Mistron Monomix is available from Luzenac America, Englewood, CO
[6]ZEEOS G200 is available from 3M, St. Paul, MN
[7]Ti-Pure R-960 is available from DuPont, Wilmington, DE
[8]Raven 410 is available from Columbian Chemicals Company, Marietta, GA The ingredients of part 1 were weighed into a can and stirred with a DBI blade for 15 minutes. The ingredients of part 2 were slowly added then stirred for 30 minutes. The ingredients of part 3 were slowly added then stirred for 60 minutes. The mixture was then dispersed in 3 passes using 2 mm glass beads. Part 4 was added with mixing and was stirred for 30 minutes.

Preparation of Common Activator Portion (Part 2) for each of the above Binder Portions (Targeted for a 70-75° F. Application Window)

| Ingredients | Parts by Weight |
| --- | --- |
| Desmodur ® N 3300A | 430.0 |
| Desmodur ® Z 4470 BA | 53.9 |
| Butyl Acetate | 285.3 |
| Ethyl 3-Ethoxy Propionate | 98.3 |
| Xylene | 130.3 |
| Dibutyl Tin Dilaurate | 0.13 |
| P-toluene Sulfonyl Isocyanate | 2.0 |

All of the ingredients were added in the order given to a metal can and mixed for 60 minutes using an impeller. During the mixing process, the mouth of the can was covered, and the contents were blanketed with nitrogen. The solution was transferred to air-tight quart containers and sealed under a nitrogen atmosphere. The following properties were met:

| | |
| --- | --- |
| Gallon Weight | 8.26-8.46 pounds/gallon |
| % Water | <0.05% wt |
| Weight Solids | 45.5-48.5% |
| % Isocyanate | 9.6-10.2% wt |
| Color | <50 APHA |

The following resins were used in the primer filler and sealer binder portions above:

Preparation of Acrylic Polymer #1

| Ingredients | Parts by Weight |
|---|---|
| Part 1 | |
| Xylene | 160.77 g |
| Part 2 | |
| Styrene | 73.44 g |
| 2-Hydroxyethyl methacrylate (HEMA) | 122.44 g |
| Isobornyl methacrylate (IBOMA) | 73.44 g |
| Methyl methacrylate (MMA) | 9.79 g |
| 2-ethylhexyl methacrylate (HEMA) | 112.65 g |
| Isobutyl methacrylate (IBMA) | 97.94 g |
| Xylene | 13.70 |
| Part 3 | |
| Xylene | 10.26 g |
| Part 4 | |
| t-Butyl peroxyacetate | 18.96 g |
| Xylene | 45.66 g |
| Part 5 | |
| Xylene | 5.71 g |
| Part 6 | |
| t-Butyl peroxyacetate | 3.29 g |
| Methyl ethyl ketone | 41.24 g |
| Part 7 | |
| Methyl ethyl ketone | 5.71 g |
| Part 8 | |
| Xylene | 30.00 g |

Part 1 was charged to a reactor containing addition funnels, reflux condenser, thermometer, and a nitrogen inlet. The solvent was heated to a reflux, approximately 140-145° C. Part 2 was added to an addition funnel and stirred for 10 minutes. Parts 2 and 4 were added to the reaction mixture simultaneously over 180 minutes, keeping the reaction temperature at 140-145° C. When the addition of part 2 and 4 were completed, part 3 was used to flush the monomer feed and monomer feed lines. Part 5 was used to flush the initiator feed and initiator feed lines. The reaction was held at reflux temperature for 15 minutes. Part 6 was added via an addition funnel after the 15 minute hold time over a 30 minute time period, while maintaining the reflux temperature at 120-125° C. When the addition was complete, the reaction was held at reflux for 30 minutes. Part 7 was added to flush the initiator feed and initiator feed lines. The reaction was cooled filtered and filled out. Part 8 was added to flush the reactor.

The acrylic polymer had a solids content of 60% and a residual monomer content of MMA 0.02%, IBOMA 0.3%, IBMA 0.3%, HEMA 0.3%, EHMA 0.5%. The weight average molecular weight was 6500.

Preparation of Dispersion Formula #1

| Ingredients | Parts by Weight |
|---|---|
| Part 1 | |
| Methyl isobutyl ketone | 13.9 |
| Propylene glycol monomethyl ether acetate | 7.6 |
| Methyl amyl ketone | 29.6 |
| Xylene | 24.9 |
| Aromatic 100[1] (155° C./177° C.) | 3.5 |
| Acrylic Polymer #1 | 214.3 |
| Anti Terra-U[2] | 1.8 |
| Anti-settling dispersion[3] | 76.8 |
| Part 2 | |
| Nicron 554[4] | 122.9 |
| Hubercarb W3N[5] | 194.4 |
| Part 3 | |
| Blanc Fixe[6] | 65.3 |
| Ti-Pure R-960[7] | 63.7 |
| Raven 410[8] | 2.1 |

[1] Aromatic 100 is available from ExxonMobile, Houston, TX
[2] Anti Terra-U is available from BYK Chemie, Wallingford, CT
[3] Dispersion of Anti Terra-U 3.75%, xylene 88.75%, and Bentone 34 7.5%. Bentone 34 is available from Elementis, Hightstown, NJ
[4] Nicron 554 is available from Luzenac Corp, Englewood, CO
[5] Hubercarb W3N is available J.M. Huber Corp, Atlanta, GA
[6] Blanc Fixe is available from Sachtleben Chemie GmbH, Duisburg, Germany
[7] T-Pure R-960 is available from DuPont, Wilmington, DE
[8] Raven 410 is available from Columbian Chemicals Company, Marietta, GA Using a stirrer with a DBI blade on low speed, part 1 was added in order and stirred for 30 minutes. After 30 minutes, the rate of stirring was increased to high and part 2 was added in order. This mixture was stirred for 15 minutes. Part 3 was then added slowly and was stirred for 60 minutes. The dispersion was then ground over 3 passes using 0.8 mm glass beads.

Preparation of Acrylic Polymer #2

| Ingredients | Parts by Weight |
|---|---|
| Part 1 | |
| Xylene | 229.12 |
| Part 2 | |
| Styrene | 73.64 |
| Methyl methacrylate | 93.19 |
| Isobutyl methacrylate | 220.93 |
| 2-Hydroxyethyl methacrylate | 98.19 |
| Part 3 | |
| t-butyl peroxyacetate | 11.78 |
| Xylene | 49.1 |
| Part 4 | |
| Xylene | 2.95 |
| Methyl ethyl ketone | 49.1 |

Part 1 was charged to a reactor and heated to reflux (138-142° C.). The ingredients of part 2 were mixed and added to the reactor simultaneously with the premixed ingredients of part 3 over a three-hour period. When the addition of parts 2 and 3 was complete, part 4 was added and the reaction was held at reflux for 1 hour. The reaction was cooled and filled out. The acrylic polymer had a weight solids content of 59.6% and a weight average molecular weight of 10500.

Preparation of Polyester Oligomer #1

| Ingredients | Parts by Weight |
| --- | --- |
| Part 1 | |
| Methyl Amyl Ketone | 168.02 |
| Pentaerythritol | 114.25 |
| Sanko HCA[1] | 3.58 |
| Tetraethyl ammonium bromide | 2.64 |
| Liquid Anhydride MHHPA 37[2] | 412.18 |
| Part 2 | |
| 1,2-Butylene oxide | 202.33 |

[1] Sanko HCA is available from Sanko Chemicals Co Ltd, Osaka, Japan
[2] Available from Lonza Chemical, Basal, Switzerland.

The ingredients of part 1 were charged to reactor with stirring and were heated to 60° C. The temperature was allowed to level off after the resulting exotherm. The reaction mixture was then heated to 140° C. and held for 2 hours. The ingredients of part 2 were charged to the reaction over a 4 hour period. The reaction temperature was maintained at 140° C. until the acid number falls below 3.0 (approx. 6 hours). The reaction mixture was cooled and filled out.

The structured polyester oligomer had a weight solids content of 81.4% and a weight average molecular weight of 1069.

Example 6

Moderate Temperature Blending of Primer Filler and a Sealer to Produce Primer Fillers with varying Sanding Times and Spray Latitude Undercoat 1 to 3 (described below) were applied in 3 coats by a expert spray technician to a film build of 3.5 to 4.9 mils. Each layer was flash dried between coats. Sanding evaluation was done at 2 and 3 hours at ambient conditions.

Undercoat 1-300 mL of Primer Filler and 75 mL of activator was mixed to give a Zahn 3 viscosity of 9.4 sec and an ICI viscosity of 25 cps. This is the 100% primer filler control. At both 2 and 3 hours this primer has commercial quality sanding performance with maximum fill.

Undercoat 2-200 mL of primer filler and 100 mL of sealer were combined to form Part 1 and this was then mixed with 75 mL of activator to give an undercoat with 8.9 sec and 20 cps Zahn 3 and ICI viscosities. This undercoat had slight improvement in spray application compared to Undercoat 1 with commercial fill properties. The hand sanding performance was not commercial until 3 hours.

Undercoat 3-150 mL of primer filler and 150 mL of sealer were combined with 75 mL of activator to give an undercoat with 8.5 sec Zahn 3 viscosity and 20 cps ICI viscosity. This undercoat had improved spray application compared to Undercoats 1 and 2 with less fill capacity. Sanding performance was not quite commercial at 3 hours. This type of primer is attractive to low production large area spraying.

In general, see increasing spray latitude, and improved smoothness with increasing amounts of sealer. This allows for selecting the desired amount of fill and spray latitude. Sandability was altered with increasing levels of sealer, which allows for tailoring the time in which one chooses to sand the repair.

Example 7

Moderate Temperature Blending of Sealer to Primer Filler to Produce Sealers with varying Fill Properties Undercoats 3 to 5 (described below) were applied in one coat by an expert spray technician to give 0.9 to 1.1 mil thickness. These coatings were flashed dried 20 minutes before top coating.

Undercoat 3-150 mL of primer filler and 150 mL of sealer were combined with 75 mL of activator to give an undercoat with sec 21.7 Zahn 2 viscosity and 20 cps ICI viscosity. This coating sprayed with good fill capacity with commercial spray latitude.

Undercoat 4-80 mL of primer filler and 160 mL of sealer were combined with 60 mL of activator to give an undercoat with 21.5 Zahn 2 viscosity and 20 cps ICI viscosity. This coating has good fill capacity with better than minimum commercial quality application.

Undercoat 5-240 mL of sealer was combined with 60 mL of activator to give an undercoat with 19.3 Zahn 2 viscosity and 20 cps ICI viscosity. This is the sealer control and has excellent spray application and less fill capacity.

In general, as the filler primer to sealer ratio increased the fill capacity of the coating increased without affecting film build while maintaining commercial spray application. This allows the painter to tailor the fill capacity to the desired quality expectation. This means the final system appearance can be varied from commercial truck finish to a high-end automotive finish.

Various other modifications, alterations, additions or substitutions of the components of the processes and compositions of this invention will be apparent to those skilled in the art without departing from the spirit and scope of this invention. This invention is not limited by the illustrative embodiments set forth herein, but rather is defined by the following claims.

What is claimed is:

1. A process for making a coating composition, said composition having adjustable properties, and for use in automotive refinish applications, said process comprising:
   choosing at least two activatable refinish coating compositions, of same automotive coating layer or of different automotive coating layers, each coating composition having
   (a) at least one distinctly different property from the other coating composition,
   (b) different binder components and
   (c) a common activator component and a common mix ratio between the activator and unactivated film forming binder component
   selecting a mix ratio for the unactivated binder portions of each of the coating compositions to achieve a new set of properties; and
   mixing, prior to introduction in spray equipment, the common activator with the aforesaid combined binder portions in the aforesaid common binder to activator, to form a new coating composition with customized properties that can be sprayed onto a vehicle.

2. The process of claim 1 wherein the common binder to activator mix ratio and selected mix ratio for the binder components are by volume.

3. The process of claim 1 wherein said activatable coating compositions are two or three-component and include at least one binder component and at least one activator component which is reactive with the binder component, and optionally at least one reducer component.

4. The process of claim 1 wherein the starting coating compositions are selected from the group consisting of refinish clearcoats, refinish primer surfacers, and refinish sealers.

5. The process of claim 3 wherein the different unactivated binder portions are mixed first and then the combined binder is mixed with the common activator component in the common volumetric mix ratio to form the new coating composition, prior to introduction in the spray equipment.

6. The process of claim 1 wherein the common binder to activator mix ratio is from 8:1 to 1:1 by volume.

7. The process of claim 1 wherein the common binder to activator mix ratio is from 4:1 to 1:1 by volume.

8. The process of claim 1 wherein the compositions are ambient cure or low bake compositions.

9. The process of claim 1 further comprising,
spraying the new coating composition onto a vehicle or part thereof; and then
curing the composition between either at room temperature or at elevated temperatures up to 160° F.

* * * * *

UNITED STATES PATENT AND TRADEMARK OFFICE
CERTIFICATE OF CORRECTION

PATENT NO. : 7,652,099 B2 Page 1 of 1
APPLICATION NO. : 11/518712
DATED : January 26, 2010
INVENTOR(S) : Fiori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Twenty-third Day of November, 2010

David J. Kappos
*Director of the United States Patent and Trademark Office*